United States Patent [19]

Agano

[11] Patent Number: 5,081,357
[45] Date of Patent: Jan. 14, 1992

[54] RADIATION IMAGE RECORDING AND READ-OUT APPARATUS

[75] Inventor: Toshitaka Agano, Kanagawa, Japan

[73] Assignee: Fuji Photo Film Co., Ltd., Kanagawa, Japan

[21] Appl. No.: 599,169

[22] Filed: Oct. 17, 1990

[30] Foreign Application Priority Data

Oct. 18, 1989 [JP] Japan .................................. 1-270737

[51] Int. Cl.$^5$ ........................................... G01N 23/04
[52] U.S. Cl. ........................... 250/327.2; 250/484.1; 378/37
[58] Field of Search .......... 250/484.1, 327.2; 378/62, 175, 181, 37

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 250/327.2 |
| 4,400,619 | 7/1989 | Kotera et al. | 250/327.2 |
| 4,855,598 | 8/1989 | Ohgoda et al. | 250/327.2 |
| 4,859,849 | 9/1989 | Shimura et al. | 250/327.2 |
| 4,864,134 | 9/1989 | Hosoi et al. | 250/327.2 |
| 4,882,489 | 11/1989 | Saotome et al. | 250/327.2 |
| 4,958,363 | 9/1990 | Nelson et al. | 378/85 |

FOREIGN PATENT DOCUMENTS 56-11395 2/1981 Japan .................................. 250/484.1

Primary Examiner—Carolyn E. Fields
Assistant Examiner—James E. Beyer
Attorney, Agent, or Firm—Sughrue, Mion, Zinn, Macpeak & Seas

[57] ABSTRACT

A radiation image recording and read-out apparatus for use in energy subtraction processing for mamma images comprises an image recording table, on which the mamma is supported and secured, and a single stimulable phosphor sheet, which can be moved from the position under the image recording table to an image read-out section and then to an erasing section. After a first exposure of the stimulable phosphor sheet to radiation is carried out at the image recording table, a radiation image stored on the stimulable phosphor sheet is read out therefrom. Thereafter, any energy remaining on the stimulable phosphor sheet is erased, and the erased stimulable phosphor sheet is moved to the position under the image recording table. A second exposure of the stimulable phosphor sheet to the radiation is then carried out, and a radiation image stored on the stimulable phosphor sheet is read out therefrom. Image signals obtained from the two image read-out operations are then subtracted from each other.

9 Claims, 2 Drawing Sheets

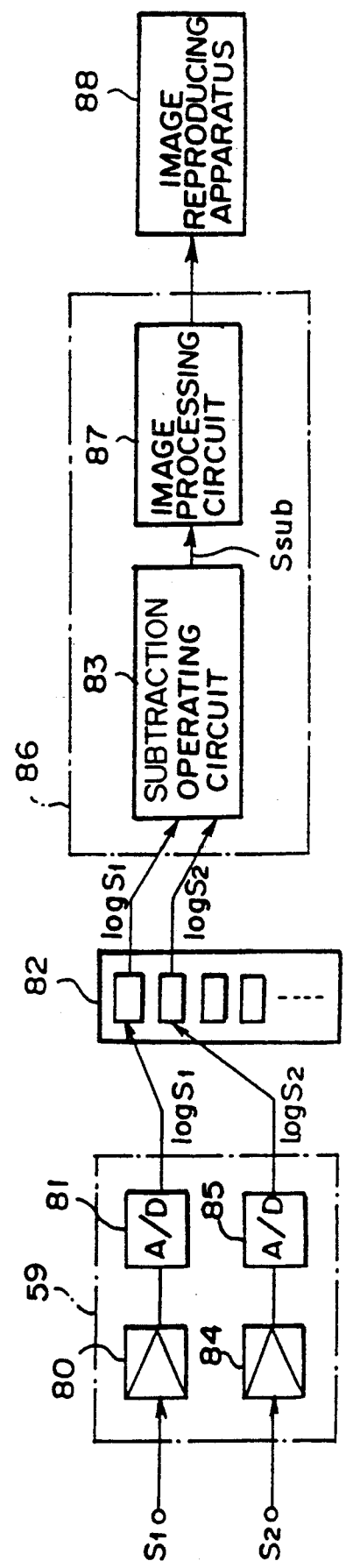

RADIATION IMAGE RECORDING AND READ-OUT APPARATUS

BACKGROUND OF THE INVENTION

1. Field of the Invention

This invention relates to a radiation image recording and read-out apparatus wherein radiation images of the mamma, on which energy subtraction processing is to be carried out, are recorded and read out. This invention particularly relates to a radiation image recording and read-out apparatus wherein two radiation images of the mamma are sequentially stored on a stimulable phosphor sheet, the stimulable phosphor sheet, on which each radiation image has been stored is exposed to stimulating rays, which cause it to emit light in proportion to the amount of energy stored thereon during its exposure to radiation, the emitted light being detected and converted into an electric image signal representing the whole radiation image, two electric image signals thus detected are then subtracted from each other, and a subtraction image is thereby obtained.

2. Description of the Prior Art

Techniques for carrying out energy subtraction processing on radiation images have heretofore been known. In energy subtraction processing, such characteristics are utilized that a specific structure of an object (for example, the organs, bones, or blood vessels in cases where the object is a human body) exhibits inherent radiation energy absorption characteristics. Specifically, an object is exposed to at least two kinds of radiation having different quality, and two radiation images, in which different images of a specific structure are embedded, are obtained. Thereafter, the image signals representing the two radiation images are weighted appropriately, and subjected to a subtraction process in order to extract the image of the specific structure.

Basically, subtraction processing is carried out with either the so-called temporal (time difference) subtraction processing method or the so-called energy subtraction processing method. In the former method, in order to extract the image of a specific structure of an object from the image of the whole object, the image signal representing a radiation image obtained without injection of contrast media is subtracted from the image signal representing a radiation image in which the image of the specific structure of the object is enhanced by the injection of contrast media. In the latter method, an object is exposed to several kinds of radiation having different energy distributions, or the energy distribution of the radiation, which has passed through an object, is changed after it has been irradiated onto one of two radiation storage means, after which the radiation impinges upon the second storage means. In this manner, two radiation images, in which different images of a specific structure are embedded, are obtained. Thereafter, the image signals representing the two radiation images are weighted appropriately, when necessary, and subjected to a subtraction process in order to extract the image of the specific structure.

Subtraction processing is extremely effective, particularly for medical diagnosis, and electronics research has continued to develop improved subtraction processing methods.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which has passed through an object, such as a human body. In this manner, a radiation image of the object is stored on the stimulable phosphor sheet. The stimulable phosphor sheet, on which the radiation image has been stored, is then scanned with stimulating rays, which cause it to emit light in proportion to the amount of energy stored thereon during its exposure to the radiation. The light emitted by the stimulable phosphor sheet, when it is exposed to the stimulating rays, is photoelectrically detected and converted into an electric image signal. The electric image signal is then processed as desired, and the processed image signal is then used during the reproduction of a visible image which has good image quality and can serve as an effective tool in, particularly, the efficient and accurate diagnosis of an illness. The visible image finally obtained may be reproduced in the form of a hard copy or may be displayed on a display device, such as a cathode ray tube (CRT) display device. In the radiation image recording and reproducing systems, the stimulable phosphor sheet is used to store the radiation image temporarily so that a final visible image can be reproduced therefrom on a final recording medium. For the sake of economy, therefore, it is desirable that the stimulable phosphor sheet be used repeatedly.

Also, a mobile X-ray diagnostic station, e.g. a bus serving as such may be provided with a radiation image recording and read-out apparatus wherein stimulable phosphor sheets are utilized. In cases where such a mobile X-ray diagnostic station moved from place to place so that mass medical examinations may be carried out, it is disadvantageous to have to load the mobile X-ray diagnostic station with a large number of stimulable phosphor sheets, and therefore the number of stimulable phosphor sheets which can be carried along with the mobile X-ray diagnostic station is limited. Therefore, it is desirable that a small number of reusable stimulable phosphor sheets be carried along with the mobile X-ray diagnostic station, and that the stimulable phosphor sheets be circulated and reused for the recording and readout of radiation images. Image signals detected from the stimulable phosphor sheets may be stored on a storage medium having a large storage capacity, such as a magnetic tape. With such a mobile X-ray diagnostic station, image signals representing the radiation images of many objects can be obtained. Also, if the stimulable phosphor sheets are circulated and reused, the recording of radiation images can be carried out continuously, and it becomes possible to increase the speed, with which radiation images are recorded in mass medical examinations. This is very advantageous from the point of view of practical use.

In order that the stimulable phosphor sheets may be reused in the manner described above, any energy remaining on the stimulable phosphor sheets after they have been scanned with stimulating rays during the readout of radiation images therefrom should be erased. For this purpose, the method disclosed in, for example, U.S. Pat. No. 4,400,619 or Japanese Unexamined Patent Publication No. 56(1981)-12599 may be employed. The erased stimulable phosphor sheets can then be reused to record radiation images.

Therefore, it is desirable that there be combined into a single apparatus: an image recording section in which a stimulable phosphor sheet capable of being circulated and reused is exposed to radiation, which has passed through an object, an image read-out section in which a radiation image stored on the stimulable phosphor sheet is read out, and an erasing section in which any energy remaining o the stimulable phosphor sheet after the radiation image has been read out therefrom is erased. A mobile X-ray diagnostic station allows medical examinations to be carried out at different locations, and the aforesaid radiation image recording and read-out apparatus is easy to load into such a mobile X-ray diagnostic station. Also, such an apparatus can easily be located in a hospital, or the like. This is very advantageous for practical use.

In the aforesaid radiation image recording and reproducing systems utilizing a stimulable phosphor sheet, the radiation image stored on the stimulable phosphor sheet is read out directly as an electric image signal. Therefore, with such radiation image recording and reproducing systems, the aforesaid subtraction processing can readily be carried out. In cases where energy subtraction processing is to be carried out, radiation images may be stored on two stimulable phosphor sheets so that the parts of the radiation images corresponding to a specific structure are different in the two radiation images. For this purposes, two-shot energy subtraction processing may be employed wherein the operation for recording a radiation image is carried out twice with two kinds of radiation having different energy distributions. Alternatively, one-shot energy subtraction processing may be employed wherein, for example, two stimulable phosphor sheets placed one upon the other are simultaneously exposed to radiation, which has passed through an object, such that they are exposed to radiation having different energy distributions.

In order to carry out one-shot energy subtraction processing, the following methods have been proposed:

(1) A method wherein a filter, which is constituted of a metal or the like and which absorbs low energy components of radiation, is located between two stimulable phosphor sheets, and radiation having different energy distributions is thereby obtained.

(2) A method wherein two stimulable phosphor sheets provided with layers of different types of stimulable phosphors are utilized so that no filter need be used and radiation images to be subjected to subtraction processing can be recorded with a single image recording operation. With this method, a stimulable phosphor sheet provided with a stimulable phosphor layer, which absorbs more of the low energy components of the radiation than the stimulable phosphor layer of the other stimulable phosphor sheet, is positioned closer to the object (closer to the radiation source), and the two stimulable phosphor sheets are simultaneously exposed to radiation. Such a method is disclosed in, for example, U.S. Pat. No. 4,855,598.

In cases where a radiation image of the mamma is recorded, a cassette in which a stimulable phosphor sheet is housed is located under the mamma. Therefore, if two-shot energy subtraction processing is employed, the mamma moves when the cassette is exchanged with a new one during the two image recording operations. As a result, an artifact occurs in a subtraction image obtained from the subtracting operations. For this reason, two-shot energy subtraction processing cannot be employed for mamma images. Accordingly, in order for energy subtraction processing for mamma images to be carried out, the one-shot process, wherein two radiation images are recorded with a single, simultaneous exposure to radiation, must have heretofore been used.

With one-shot energy subtraction processing, two radiation images can be recorded simultaneously, and therefore no artifact due to movement of the object (mamma) occurs in the subtraction image. However, oneshot energy subtraction processing has the drawback in that the image quality of the radiation image stored on the second stimulable phosphor sheet is lower than the image quality of the radiation image stored on the first stimulable phosphor sheet.

Therefore, it is desired that energy subtraction processing for mamma images can be carried out with the two-shot process, which yields a subtraction image having good image quality, such that no artifact due to movement of the object occurs in the subtraction image.

A novel apparatus for carrying out an energy subtraction processing method using stimulable phosphor sheets has been disclosed in, for example, U.S. Pat. No. 4,859,849. With the disclosed apparatus, at least two stimulable phosphor sheets are circulated through an image read-out section and an erasing section. However, such an apparatus is of an excessively large scale and unsuitable for the recording of mamma images from the point of view of the cost and floor space requirement. Therefore, a need exists for an apparatus which is small and which can yield an energy subtraction image of the mamma having good image quality.

SUMMARY OF THE INVENTION

The primary object of the present invention is to provide a radiation image recording and read-out apparatus which is small in size and which yields an energy subtraction image of the mamma having good image quality.

Another object of the present invention is to provide a radiation image recording and read-out apparatus for use in energy subtraction processing for mamma images, which apparatus is easy to install, move, and load into a mobile diagnostic station.

The radiation image recording and read-out apparatus in accordance with the present invention is characterized by having an image recording table, on which the mamma is supported and secured, and having a single stimulable phosphor sheet, which can be moved from the position under the image recording table (image recording section) to an image read-out section and then to an erasing section. After a first exposure of the stimulable phosphor sheet to radiation is carried out at the image recording table, a radiation image stored on the stimulable phosphor sheet is read out therefrom. Thereafter, any energy remaining on the stimulable phosphor sheet is erased, and the erased stimulable phosphor sheet is moved to the position under the image recording table. A second exposure of the stimulable phosphor sheet to the radiation is then carried out, and a radiation image stored on the stimulable phosphor sheet is read out therefrom. Image signals obtained from the two image read-out operations are then subtracted from each other.

Specifically, the present invention provides a radiation image recording and read-out apparatus for use in energy subtraction processing for mamma images, which comprises:

i) a conveyance means for conveying a single stimulable phosphor sheet, which is capable of storing a radiation image thereon, along a predetermined path, ii) an image recording section which is located in the vicinity of said path and which is provided with:
   a) a radiation source, and
   b) an image recording table, on which the mamma is supported and secured and which is located between said radiation source and part of said path, radiation being produced by said radiation source and caused to pass through the mamma and then to impinge upon said stimulable phosphor sheet, whereby a radiation image of the mamma is stored on said stimulable phosphor sheet, iii) an image read out section which is located in said path and which is provided with:
   a) a stimulating ray source for producing stimulating rays, which scan said stimulable phosphor sheet carrying said radiation image stored thereon at said image recording section and which cause it to emit light in proportion to the amount of energy stored thereon during its exposure to the radiation, and
   b) a photoelectric read-out means for detecting the emitted light and converting it into an image signal, iv) an erasing section which is located in said path and in which, before a next radiation image is stored on said stimulable phosphor sheet after said image signal has been obtained therefrom in said image read-out section, energy remaining on said stimulable phosphor sheet is erased, v) a sheet moving means for moving said stimulable phosphor sheet from said image recording section to said image read-out section and then to said erasing section along said path, said sheet moving means thereafter moving said stimulable phosphor sheet to said image recording section, vi) a radiation change-over means with which the quality of the radiation in said image recording section is changed over between at least two kinds of quality, vii) a control means which operates said sheet moving means in synchronization with the change-over operation of said radiation change-over means, such that two radiation images are sequentially stored with the radiation having different quality on said stimulable phosphor sheet during two image recording operations, and said two radiation images stored with the radiation having different quality during two image recording operations are read out during two image read-out operations in said image read-out section, and viii) an operating section in which image signals, which represent the two radiation images stored with the radiation having different quality and which were detected during the two image read-out operations in said image read-out section, are weighted and then subtracted from each other.

In the radiation image recording and read-out apparatus in accordance with the present invention, the single stimulable phosphor sheet is conveyed along the predetermined path. For this purpose, the single stimulable phosphor sheet may be conveyed reciprocally along a linear path or may be circulated along a looplike path.

By way of example, the radiation change-over means may be a means, which changes over the voltage applied to the radiation source, or a means with which a radiation energy absorbing filter, such as an iodine filter, is moved into and out of the space between the radiation source and the stimulable phosphor sheet.

The term "radiation energy absorbing filter" as used herein means a radiation energy converting filter which converts the energy distribution of the radiation passing therethrough. The radiation energy absorbing filter does not completely filter out the radiation.

With the radiation image recording and read-out apparatus in accordance with the present invention, no cassette is used, but the mamma is secured on the image recording table. Therefore, the mamma does not move for a long time on the image recording table. After a first radiation image is recorded on the single stimulable phosphor sheet and read out therefrom and any energy remaining thereon is then erased, a next radiation image is recorded on the erased stimulable phosphor sheet. Two image signals thus obtained subtracted from each other, and an image signal representing a subtraction image is thereby obtained. Accordingly, with the radiation image recording and read-out apparatus, which is small in size, a subtraction image having good image quality can be obtained from two-shot energy subtraction processing for mamma images.

Also, because only the single stimulable phosphor sheet is used, adjustment of its position can be achieved easily during the image recording and read-out operations. Additionally, structure noise of the stimulable phosphor sheet (i.e. noise due to variance in the thickness, material, or the like) is constant. Such structure noise can be eliminated by the subtraction process. Therefore, the signal-to-noise ratio (S/N ratio) can be easily kept high, and the image quality of the subtraction image can be easily kept good. Moreover, because only the single stimulable phosphor sheet is used, no problem occurs in that light, which is instantaneously emitted by the stimulable phosphor sheet when it is exposed to the radiation, causes noise to occur in an image signal, which is being detected from a different stimulable phosphor sheet during an image readout operation.

BRIEF DESCRIPTION OF THE DRAWINGS

FIG. 2 is a block diagram showing a radiation image read-out circuit, a memory, a signal processing circuit, or the like, in the embodiment of FIG. 1.

DESCRIPTION OF THE PREFERRED EMBODIMENTS

Figure 1:
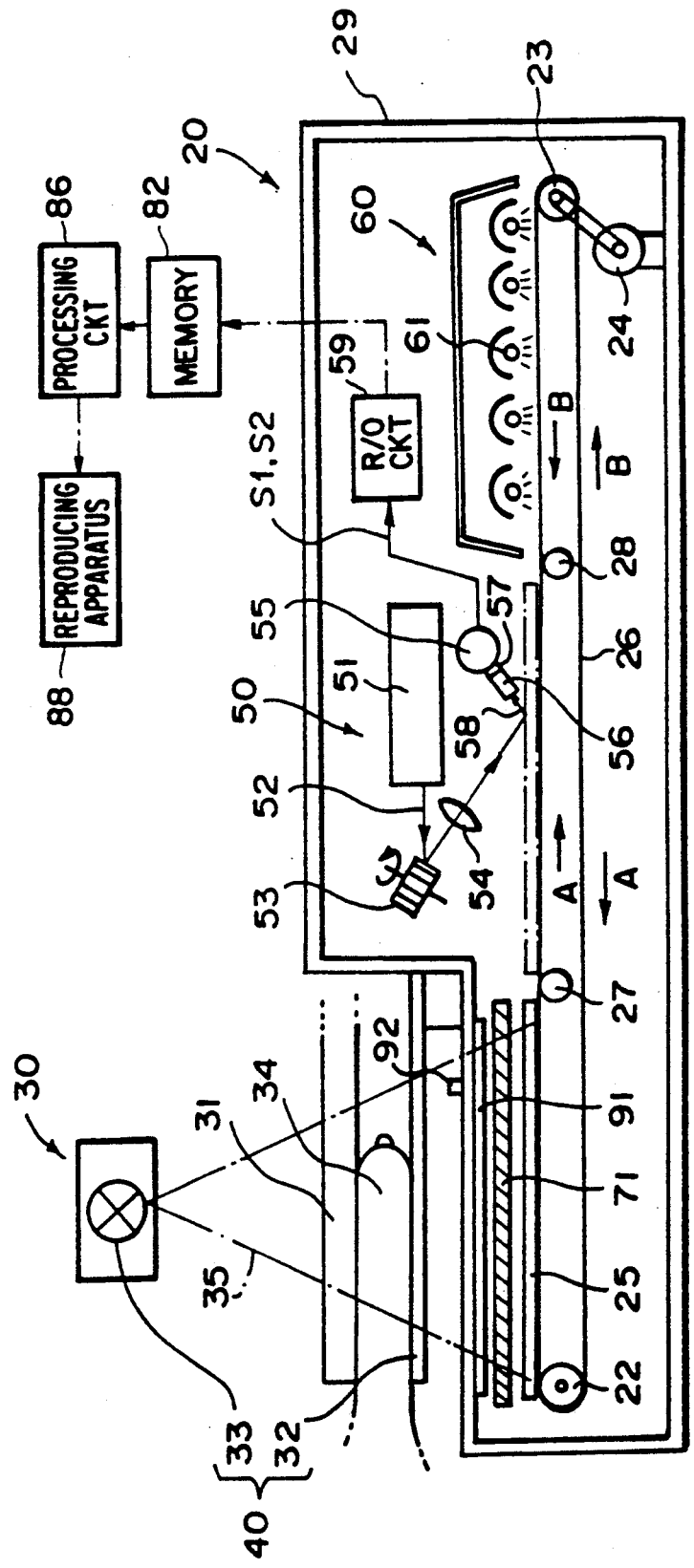
FIG. 1 is a schematic side view showing an embodiment of the radiation image recording and read-out apparatus in accordance with the present invention.

The present invention will hereinbelow be described in further detail with reference to the accompanying drawings.

FIG. 1 schematically shows an embodiment of the radiation image recording and read-out apparatus in accordance with the present invention, which is used in energy subtraction processing for mamma images.

With reference to FIG. 1, this embodiment is composed of a main body 20 and a radiation source housing section 30. In a housing 29 of the main body 20a, a pair of pulleys 22 and 23 are located parallel to each other. An endless belt 26, which moves a stimulable phosphor sheet 25, is threaded over the pulleys 22 and 23. The pulleys 22 and 23 are rotated by a motor 24 in the directions indicated by the arrows A and B. The pulleys 22 and 23, rollers 27 and 28, and the motor 24 constitute a belt feed means.

A mamma image recording table 32 is located above and facing the portion of the endless belt 26, which is positioned between the pulley 22 and the roller 27. The aforesaid radiation source housing section 30 houses therein a radiation source 33, which may be constituted of an X-ray tube, or the like, and which faces the image recording table 32. When radiation images of the mamma (object) 34 are to be recorded, the mamma 34 is secured and supported on the image recording table 32 by a push plate 31 from above, and the radiation source 33 is then activated to produce the radiation 35. The radiation 35 passes through the mamma 34 and then impinges upon the stimulable phosphor sheet 25, which is supported on the endless belt 26. In this manner, a radiation image of the mamma 34 is stored on the stimulable phosphor sheet 25 (specifically, on the stimulable phosphor layer overlaid on the stimulable phosphor sheet 25).

As will be clear from the foregoing, in this embodiment, an image recording section 40 is constituted of the image recording table 32 and the radiation source 33. In this embodiment, a grid 91 for eliminating scattered radiation is provided between the image recording table 32 and the stimulable phosphor sheet 25.

The radiation image stored on the stimulable phosphor sheet 25 is read out as an electric image signal in an image read-out section 50. The image read-out section 50 comprises a laser beam source 51, and a light deflector 53, which may be constituted of a rotating polygon mirror, or the like. The light deflector 53 reflects and deflects a laser beam 52, which serves as stimulating rays and which is produced by the laser beam source 51, in the main scanning direction. The image read-out section 50 is also provided with a scanning lens 54 for converging the laser beam 52, which has been deflected by the light deflector 53, into a small spot having a predetermined diameter at every position on the stimulable phosphor sheet 25, which position is to be scanned, and the motor 24, which also serves as a sub- a scanning means and which operates the endless belt 26 such that the stimulable phosphor sheet 25 moves in the sub-scanning direction at a predetermined speed at least during the image read-out operation. The image read-out section 50 further comprises a long photomultiplier 55, which serves as a photoelectric read-out means and which is located such that a light receiving face of the long photomultiplier 55 extends along a scanning line (main scanning line) of the laser beam 52 on the stimulable phosphor sheet 25, and a long light guide member 56, which is optically coupled with the light receiving face of the long photomultiplier 55. Additionally, a filter 57 for preventing the laser beam 52 from impinging upon the long photomultiplier 55, is located between the light guide member 56 and the long photomultiplier 55. The long photomultiplier is described in detail in, for example, U.S. Pat. No. 4,864,134.

After the radiation image of the mamma 34 has been stored on the stimulable phosphor sheet 25 in the manner described above, the motor 24 is rotated to move the endless belt 26 at a predetermined speed in the directions indicated by the arrows A, A. Therefore, the stimulable phosphor sheet 25 is moved by the endless belt 26 in the direction indicated by the upper arrow A. While the stimulable phosphor sheet 25 is thus moved in the sub-scanning direction by the motor 24, the laser beam source 51 and the light deflector 53 are activated, and the laser beam 52 scans the stimulable phosphor sheet 25 in the main scanning direction. When the stimulable phosphor sheet 25 is exposed to the laser beam 52, the exposed portion of the stimulable phosphor sheet 25 emits light 58 in proportion to the amount of energy stored thereon during its exposure to the radiation 35. The emitted light 58 enters the light guide member 56 and is efficiently detected by the long photomultiplier 55. Simultaneously with the main scanning of the laser beam 52 carried out in the manner described above, the stimulable phosphor sheet 25 is moved in the sub-scanning direction as described above. Accordingly, the radiation image stored on the stimulable phosphor sheet 25 is two-dimensionally detected. A signal S1 is generated by the long photomultiplier 55 and is fed to a read-out circuit 59.

After the radiation image has been read out from the stimulable phosphor sheet 25 in the manner described above, the stimulable phosphor sheet 25 is moved by the endless belt 26 in the direction indicated by the upper arrow A. The stimulable phosphor sheet 25 thus passed below an erasing section 60, which is located in the vicinity of the pulley 23, and any energy remaining on the stimulable phosphor sheet 25 is erased. The erasing section 60 is constituted of erasing light sources 61, 61, ..., which are located above the endless belt 26. The erasing light sources 61, 61, ... are constituted of fluorescent lamps, or the like, and mainly produce erasing light having wavelengths falling within the stimulation wavelength rang of the stimulable phosphor of the stimulable phosphor sheet 25. The erasing light sources 61, 61, ... are turned on when the stimulable phosphor sheet 25 moves below the erasing section 60. As the stimulable phosphor sheet 25 is exposed to the erasing light, any energy remaining on the stimulable phosphor sheet 25 after the radiation image has been read out therefrom is released therefrom.

In this manner, energy remaining on the stimulable phosphor sheet 25 is erased to such an extent that the stimulable phosphor sheet 25 is reusable for the recording of a next radiation image. Therefore, the image recording and read-out operations can be repeated on the stimulable phosphor sheet 25. As the erasing light sources 61, 61, ..., tungsten-filament lamps, halogen lamps, infrared ray lamps or xenon flash lamps as disclosed in U.S. Pat. No. 4,400,619 may be used as well as the aforesaid fluorescent lamps. The erasing section 60 may also be constituted of surface light sources such as panels each composed of light emitting diodes (LED's) arrayed two-dimensionally or electroluminescence plates (EL plates).

After the stimulable phosphor sheet 25 has been erased in the manner described above, the endless belt 26 is moved in the directions indicated by the arrows B, B. Therefore, the stimulable phosphor sheet 25 is moved in the direction indicated by the upper arrow B to the image recording section 40. In synchronization with the movement of the stimulable phosphor sheet 25 to the image recording section 40, a radiation energy absorbing filter 71, which may be an iodine filter, is inserted between the image recording table 32 and the stimulable phosphor sheet 25. Thereafter, the radiation source 32 is activated again, and the radiation, which has passed through the mamma 34, is irradiated to the stimulable phosphor sheet 25. During the operations described above, the mamma 34 is kept pushed by the push plate 31 and secured on the image recording table 32, and therefore the position of the mamma 34 does not change.

After the second image recording operation has been carried out, the stimulable phosphor sheet 25 is again moved to the image read-out section 50, and the radiation image stored on the stimulable phosphor sheet 25 is read out therefrom in the same manner as that in the first image read-out operation. A signal S2 (i.e. the signal representing the radiation image, which was stored on the stimulable phosphor sheet 25 during the second image recording operation) is generated by the long photomultiplier 55 in the image read-out section 50 and is also fed to the read-out circuit 59. The signals S1 and S2, which have thus been fed to the read-out circuit 59, are fed to a memory 82 and then to a signal processing circuit 86. The signal processing circuit 86 processes the signals received from the memory 82, and the processed signals are then fed to an image reproducing apparatus 88.

How the signals S1 and S2 are processed in the read-out circuit 59 and subsequent circuits will hereinbelow be described with reference to FIG. 2. As described above, the signal S1 generated by the long photomultiplier 55 is fed to the read-out circuit 59. In the read-out circuit 59, the signal S1 is logarithmically amplified by a logarithmic amplifier 80, and is then digitized by an A/D converter 81 into a digital read-out image signal logS1. The digital read-out image signal logS1 is temporarily stored in the memory 82, then read therefrom and sent to a subtraction operating circuit 83 in the signal processing circuit 86. Also, the signal S2 generated by the long photomultiplier 55 is fed to the read-out circuit 59. In the read-out circuit 59, the signal S2 is logarithmically amplified by a logarithmic amplifier 84 and is then digitized by an A/D converter 85 into a digital read-out image signal logS2. The digital read-out image signal logS2 thus obtained is temporarily stored in the memory 82, then read therefrom and sent to the subtraction operating circuit 83 in the signal processing circuit 86.

The subtraction operating circuit 83 weights the image signals logS1 and logS2, and subtracts the image signal components of the weighted image signals from each other which represent corresponding picture elements in the two radiation images. Thus a digital difference signal Ssub is obtained, which can be expressed as $$Ssub = a \cdot logS1 - b \cdot logS2 - c$$

where a and b each denote a weighting coefficient, and c denotes a bias component. The difference signal Ssub is fed into the image processing circuit 87 which carries out image processing, such as gradation processing or frequency response processing, on the difference signal Ssub. After being processed, the difference signal Ssub is sent to the image reproducing apparatus 88 and used during the reproduction of a visible radiation image.

The image reproducing apparatus 88 may be a display means such as a cathode ray tube (CRT) or a recording apparatus for carrying out light beam scanning recording on a photosensitive film, or may be replaced by an apparatus for storing the image signals in an image file on an optical or magnetic disk.

In the embodiment described above, the read-out circuit 59 is provided with the logarithmic amplifiers 80, 84 and the A/D converters 81, 85 for the signals S1 and S2. Alternatively, both signals S1 and S2 may be fed into a single logarithmic amplifier and a single A/D converter. The the read-out image signals logS1 and logS2 generated by the A/D converter may then be fed to the memory 82 with different timings.

If the weighting coefficients a and b are adjusted to appropriate values in the course of the aforesaid subtracting operations being carried out, image signal components representing parts of the mamma 34 other than the specific structure (e.g. a pernicious tumor) are eliminated in the obtained difference signal Ssub. Therefore, a visible image of the specific structure can be reproduced from the difference signal Ssub.

Energy subtraction processing is described in detail in, for example, U.S. Pat. Nos. 4,855,598 and 4,859,849.

Instead of the radiation energy absorbing filter 71 being used, the quality of the radiation can also be changed by changing over the tube voltage of the radiation source.

I claim:

1. A radiation image recording and read-out apparatus for use in energy subtraction processing for mamma images, which comprises:
   i) a conveyance means for conveying a single stimulable phosphor sheet, which is capable of storing a radiation image thereon, along a predetermined path,
   ii) an image recording section which is located in the vicinity of said path and which is provided with:
      a) a radiation source, and
      b) an image recording table, on which the mamma is supported and secured and which is located between said radiation source and part of said path,
         radiation being produced by said radiation source and caused to pass through the mamma and then to impinge upon said stimulable phosphor sheet, whereby a radiation image of the mamma is stored on said stimulable phosphor sheet,
   iii) an image read-out section which is located in said path and which is provided with:
      a) a stimulating ray source for producing stimulating rays, which scan said stimulable phosphor sheet carrying said radiation image stored thereon at said image recording section and which cause it to emit light in proportion to the amount of energy stored thereon during its exposure to the radiation, and
      b) a photoelectric read-out means for detecting the emitted light and converting it into an image signal,
   iv) an erasing section which is located in said path and in which, before a next radiation image is stored on said stimulable phosphor sheet after said image signal has been obtained therefrom in said image read-out section, energy remaining on said stimulable phosphor sheet is erased,
   v) a sheet moving means for moving said stimulable phosphor sheet from said image recording section to said image read-out section and then to said erasing section along said path, said sheet moving means thereafter moving said stimulable phosphor sheet to said image recording section,
   vi) a radiation change-over means with which the quality of the radiation in said image recording section is changed over between at least two kinds of quality,
   vii) a control means which operates said sheet moving means in synchronization with the change-over operation of said radiation change-over means, such that two radiation images are sequentially stored with the radiation having different quality on said stimulable phosphor sheet during two image recording operations, and said two radiation images stored with the radiation having different quality during two image recording operations are read out during two image read-out operations in said image read-out section, and viii) an operating section in which image signals, which represent the two radiation images stored with the radiation having different quality and which were detected during the two image read-out operations in said image read-out section, are weighted and then subtracted from each other.

2. An apparatus as defined in claim 1 wherein said predetermined path is linear, and said conveyance means conveys said stimulable phosphor sheet reciprocally along the linear path.

3. An apparatus as defined in claim 1 wherein said radiation change-over means changes over the voltage applied to said radiation source.

4. An apparatus as defined in claim 1 wherein said radiation change-over means moves a radiation energy absorbing filter into and out of the space between said radiation source and said stimulable phosphor sheet.

5. An apparatus as defined in claim 4 wherein said radiation energy absorbing filter is an iodine filter.

6. An apparatus a defined in claim 1 wherein said stimulating rays are a laser beam.

7. An apparatus as defined in claim 1 wherein said radiation source remains stationary during operation.

8. An apparatus defined in claim 1 wherein said radiation passes through the mamma and onto the stimulable phosphor sheet without passing through any other portion of a patient.

9. A radiation image recording and read-out apparatus for use in energy subtraction processing for mamma images from a patient, said apparatus comprising:

i) a conveyance means for conveying a single stimulable phosphor sheet, which is capable of storing a radiation image thereon, along a predetermined path, ii) an image recording section comprising:
 a) a stationary radiation source, and
 b) an image recording table, on which the mamma is supported and secured and which is located between said radiation source and part of said path, such that radiation produced by said radiation source passes through the mamma and does not pass through any other part of said patient, whereby a radiation image of the mamma is stored on said stimulable phosphor sheet, iii) an image read-out section comprising:
 a) means for scanning said stimulable phosphor sheet carrying said radiation image and for causing said phosphor sheet to emit light in proportion to the amount of energy stored thereon, and
 b) means for detecting and converting the emitted light into an image signal, iv) an erasing section for erasing energy remaining on said stimulable phosphor after said image signal has been obtained therefrom, v) a sheet moving means for repeatedly moving said stimulable phosphor sheet from said image recording section to said image read-out section and then to said erasing section, and back to said image recording section.

vi) a radiation change-over means with which the quality of the radiation in said image recording section is changed over between at least two kinds of quality, vii) a control means which operates said sheet moving means in synchronization with the change-over operation of said radiation change-over means, such that two radiation images are sequentially stored with the radiation having different quality on said stimulable phosphor sheet during two image recording operations, and said two radiation images stored with the radiation having different quality during two image recording operations are read out during two image read-out operations in said image read-out section, and viii) an operating section in which image signals, which represent the two radiation images stored with the radiation having different quality and which were detected during the two image read-out operations in said image read-out section, are weighted and then subtracted from each other.

* * * * *